United States Patent [19]
Yoshio

[11] Patent Number: 5,105,412
[45] Date of Patent: Apr. 14, 1992

[54] RECORDING MEDIUM PLAYING APPARATUS FOR CORRECTING AUDIO SIGNALS USING AN APPROPRIATE SOUND FIELD

[75] Inventor: Junichi Yoshio, Tokorozawa, Japan

[73] Assignee: Pioneer Electronics Corporation, Tokyo, Japan

[21] Appl. No.: 566,116

[22] Filed: Aug. 13, 1990

[30] Foreign Application Priority Data

Feb. 16, 1990 [JP] Japan .................................. 2-35958

[51] Int. Cl.$^5$ ............................................. G11B 7/00
[52] U.S. Cl. ...................................... 369/48; 369/49; 369/50; 369/33
[58] Field of Search ................... 369/48, 49, 50, 59, 369/32, 30, 34, 33, 2, 86, 87; 381/18, 98, 103

[56] References Cited

U.S. PATENT DOCUMENTS

| | | | |
|---|---|---|---|
| 4,661,982 | 4/1987 | Kitazato et al. | 381/98 |
| 4,841,506 | 6/1989 | Kiyoura et al. | 369/34 |
| 4,856,064 | 8/1989 | Iwamatsu | 381/18 |
| 4,922,476 | 5/1990 | Kiyoura et al. | 369/33 |
| 4,993,008 | 2/1991 | Shiba | 369/54 |

Primary Examiner—Roy N. Envall, Jr.
Assistant Examiner—Thang V. Tran
Attorney, Agent, or Firm—Wegner, Cantor, Mueller & Player

[57] ABSTRACT

A recording medium playing apparatus having a sound field control function. A memory stores sound field data representing specified sound field patterns in conjunction with recording medium ID data. Upon playback, appropriate sound field data is retrieved based on the ID data and is used to correct audio signals with the corresponding sound field. Every time a new recording medium is set, the relevant sound field is automatically established.

3 Claims, 5 Drawing Sheets

RECORDING MEDIUM PLAYING APPARATUS FOR CORRECTING AUDIO SIGNALS USING AN APPROPRIATE SOUND FIELD

BACKGROUND OF THE INVENTION

1. Field of the Invention

The present invention relates to a recording medium playing apparatus such as a disk player.

2. Description of Background Information

Recording of music onto such recording media as disks is mostly performed in an acoustically conditioned studio or like environment where there occurs little acoustic reflection. In order to enhance the quality of reproduced music, some acoustic reflections that did occur during the performance of music may be cut out upon recording onto the recording medium, or some acoustic reflections that are different from what actually took place during the performance may be added when recorded onto the medium. The recording medium thus prepared may not duplicate exactly the same sound effects as in the acoustically controlled space if reproduced conventionally in the typical household environment or in the ordinary car interior.

Meanwhile, there has existed sound field reproducing equipments that perform corrective processing such as delays on the audio signal so as to simulate sound effects in the acoustically controlled space. Using the equipment of this kind makes it possible to reproduce, in the home and car interior, the reflecting effects similar to those experienced in concert halls and other acoustically controlled environments.

This equipment is also designed to provide different sound effects appropriate to different kinds of music. For example, the playback of jazz music may be matched with the sound effects that would be heard in a jazz club; pieces of disco music may be accompanied by the effects simulating the ambience of a discotheque.

However, the sound effect reproducing equipment requires new adjustments to be made every time sound effects of a different kind are desired. This means that it is necessary to do the chores of making the sound field adjustments whenever a recording medium containing a different kind of music is set on the recording medium playing apparatus.

SUMMARY OF THE INVENTION

It is therefore an object of the present invention to provide a recording medium playing apparatus which has a sound field reproducing function for automatically setting an appropriate sound field corresponding to each recording medium to be played back.

The recording medium playing apparatus according to the present invention performs sound field correcting processing on the audio signal being read from the recording medium, the apparatus comprising a memory means and a sound field control means. The memory means stores sound field data representing sound field patterns designated by reproduced sound field designating operations, the sound field data being matched in storage with ID data from the recording medium. The sound field control means reads from the memory means the sound field data deemed to correspond to the current recording medium according to the ID data thereof, and subjects audio signals to sound field processing in accordance with the sound field data that was read out.

DETAILED DESCRIPTION OF PREFERRED EMBODIMENTS

Preferred embodiments of the present invention will now be described by referring to the accompanying drawings.

Figure 1:
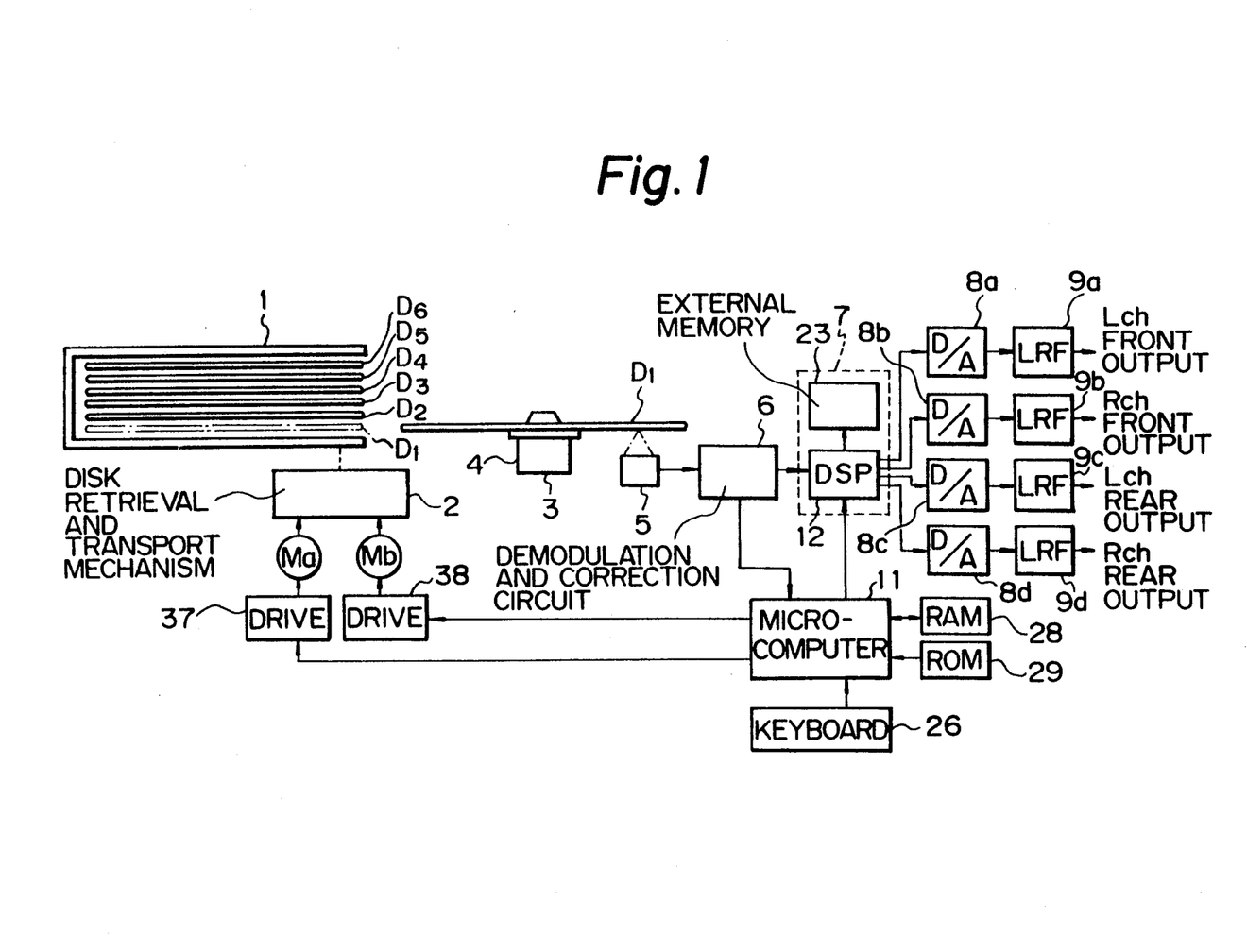
FIG. 1 is a schematic view of a multiple disk player embodying the present invention.

FIG. 1 outlines the construction of a multiple disk player, a recording medium playing apparatus that embodies the invention. With this player, a plurality of disks are set in a disk magazine for continuous playback wherein two or more disks are played back uninterrupted, for programmed playback wherein pieces of music are reproduced from the recording medium according to previously programmed sequences, or for random playback wherein pieces of music are reproduced randomly according to randomly generated sequences or the like. In FIG. 1, a magazine 1 illustratively contains six disks which are arranged in sequence at a predetermined pitch. Six trays, not shown, for supporting the disks are movably attached to the magazine 1, to project therefrom and to be retracted therein. The magazine 1 is removably attached to a predetermined location of the player body. One of the six disks $D_1$ through $D_6$ mounted on the trays attached to the magazine 1 is retrieved by a disk retrieval and transport mechanism 2.

The disk retrieval and transport mechanism 2 comprises a tray pushing member, a disk clamp mechanism, a positioning plate and sensors, all not shown. The tray pushing member pushes a tray out of the magazine 1 so as to move the disk therefrom onto a turntable 4. The disk clamp mechanism clamps the disk that is moved onto the turntable 4 by the tray pushing member. The positioning plate changes the position of the tray pushing member relative to the orientation of the disks in the magazine 1. The sensors detect where the positioning plate is located, whether the disk clamp mechanism is activated, and other relevant status of the disk retrieval and transport mechanism 2. The positioning plate is driven by a motor Ma and the tray pushing member by a motor Mb. In operation, the positioning plate comes opposite to the tray containing the desired disk and positions the tray pushing member with respect to the tray. The tray pushing member is then activated to push out the tray so that the disk thereon is selected. The magazine 1 and the disk retrieval and transport mechanism 2 are disclosed in detail by the Japanese Patent Provisional Publication No. 62-14369.

A spindle motor 3 rotates the disk from which a pickup 5 reads data, i.e., a read RF signal. The read RF signal is demodulated by a demodulation and correction circuit 6 for error correction and other processing. The output from the demodulation and correction circuit 6 is a digital audio signal which is supplied to a sound field control circuit 7. As will be described later, the sound field control circuit 7 comprises a DSP (digital signal processor) and an external RAM connected thereto. The sound field control circuit 7 is supplied with sound field data from a microcomputer 11, the data representing sound field patterns of the audio signal.

Having passed the sound field control circuit 7, the digital audio signal has a front and a rear output for each of the left and right channels. The front and rear outputs are converted to analog audio signals by D/A converters 8a through 8d. The analog audio signals are output via LPFs (low-pass filters) 9a through 9d. The output audio signals pass through amplifiers, not shown, to be reproduced by front and rear speakers, not shown, on both of the right and left channels. The sound field of the reproduced sound from the speakers is determined by the sound field data that the microcomputer 11 supplies to the sound field control circuit 7. The demodulation and correction circuit 6 supplies the microcomputer 11 with sub-code signals containing TOC (table of contents) data. The sound field control circuit 7 and microcomputer 11 constitute the sound field control means.

Figure 2:
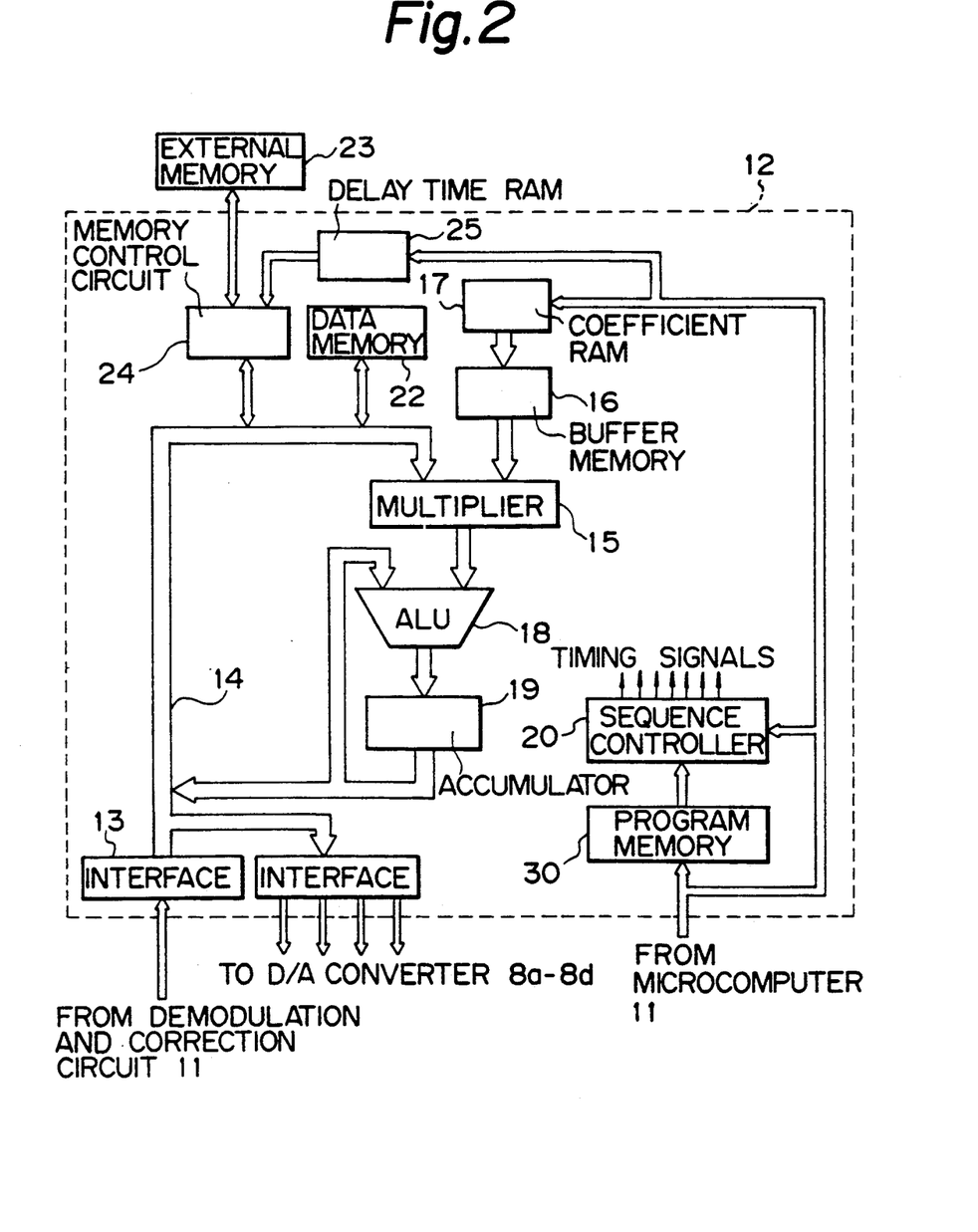
FIG. 2 is a block diagram specifically showing a sound field control circuit in the player of FIG. 1.

Referring to the sound field control circuit 7, as shown in FIG. 2, the input signal is fed to an input interface 13 in a DSP 12. A data bus 14 is connected to the input interface 13. The data bus 14 is connected to a data memory 22 for temporarily storing data items as well as to one input of a multiplier 15. The other input of the multiplier 15 is connected to a buffer memory 16 for containing coefficient data. A coefficient RAM 17 is connected to the buffer memory 16, the RAM containing coefficient data items. From the RAM 17, the coefficient data items are read one at a time according to a timing signal from a sequenace controller 20, to be described later. The coefficient data items are fed to the buffer memory 16 for storage. From the buffer memory 16, the coefficient data items are supplied to the multiplier 15. An ALU (arithmetic and logic unit) 18 is provided to accumulate the computed output from the multiplier 15. One input of the ALU 18 is supplied with the output from the multiplier 15; the other input is connected to the data bus 14. The computed output from the ALU 18 is connected to an accumulator 19 whose output is connected to the data bus 14. The data bus 14 is connected to a memory control circuit 24 that controls write and read operations to and from an external memory 23. The memory control circuit 24 is connected to a delay time RAM 25 that contains delay time data items. The memory control circuit 24 performs write and read operations of input audio signal data to and from the external memory 23 so that the audio signal data is delayed by the appropriate delay time stored in the delay time RAM 25.

An output interface 21 is connected to the data bus 14. The digital audio signal from the output interface 21 is supplied over the data bus 14 to the D/A converters 8a through 8d.

The operations of the interface 13 and 21, multiplier 15, coefficient RAM 17, ALU 18 accumulator 19 and memory control circuit 24 are controlled by the sequence controler 20. The sequence controller 20 operates under control by the processing prograam stored in a program memory 30 as well as according to instructions from the microcomputer 11.

A keyboard 26 is connected to the microcomputer 11. The keyboard 26 has a plurality of sound field mode keys by which to specify one of sound field modes from 1 one each representing different sound field characteristics. Also provided on the keyboard 26 are memory and disk number keys, not shown. These keys are operated to have the microcomputer 11 control the rewriting of the processing program, of the coefficient data in the RAM 17 and of the delay time data in the RAM 25. Furthermore, a RAM 28 and a ROM 29 constituting the memory means are connected to the microcomputer 11. The RAM 28 stores sound field numbers that correspond to disk numbers as will be described later. The ROM 29 contains the processing program for each predetermined sound field mode, items of coefficient data, and items of delay time data.

In the sound field control circuit 7 of the above construction, the digital audio signal data is sent via the interface 13 to the data meory 22 for storage therein. The sequence controller 20 provides various timings: the timing for data to be read through the interface 3, the timing for data to be selectively transferred from the data memory 22 to the multiplier 15, the timing for individual items of coefficient data to be output from the RAM 17, the timing for the multiplier 15 to perform multiply operations, the timing for the ALU 18 to perform add operations, the timing for the accumulator 19 to effect its output, and the timing for the interface 21 to output the computed result.

With the above timings provided, the audio signal data entered from the data memory 22 is sent to the memory control circuit 24 over the data bus 14. The memory control circuit 24 successively writes the supplied signal data into the external memory 23. Meanwhile, delay time data is read successively from the delay time RAM 25 as per the timing signal from the sequence controller 10. At intervals of the delay time designated by the delay time data, items of the signals data are read one by one by the moemory controller circuit 24. The signal data items thus read out are supplied to the data memory 22 over the data bus 14 and stored therein as delay signal data.

The audio signal data stored in the data memory 22 or the delay signal data obtained by the data delaying process above is read out successively and supplied to the multiplier 5. Meanwhile, coefficient data is read successively from the RAM 17 and placed into the buffer memory 16 for storage. For example, the multiplier 15 receives a coefficient data items $\alpha_1$ from the bufer memory 16 and a data item $d_1$ from the data memory 22. The first operation that the multiplier 15 performs is "$\alpha_1 \cdot d_1$." After the operation, the ALU 18 performs an operation "$0 + \alpha_1 \cdot d_1$," the result thereof being placed in the accumulator 19. When the buffer 16 outputs a coefficient data item $\alpha_2$ and the data memory 22 outputs a data item $d_2$, the multiplier 15 performs an operation "$\alpha_2 \cdot d_2$." The accumulator 19 outputs the "$\alpha_1 \cdot d_1$" so that the ALU 18 performs an operation "$\alpha_1 \cdot d_1 + \alpha_2 \cdot d_2$." The result of this operation is placed in the accumlator 19. The multiply and add operations above are repeated to compute $$\text{``} \sum_{i=1}^{n} \alpha_i \cdot d_i \text{.''}$$

In this manner, the initial reflected sound data is created.

Figure 3:
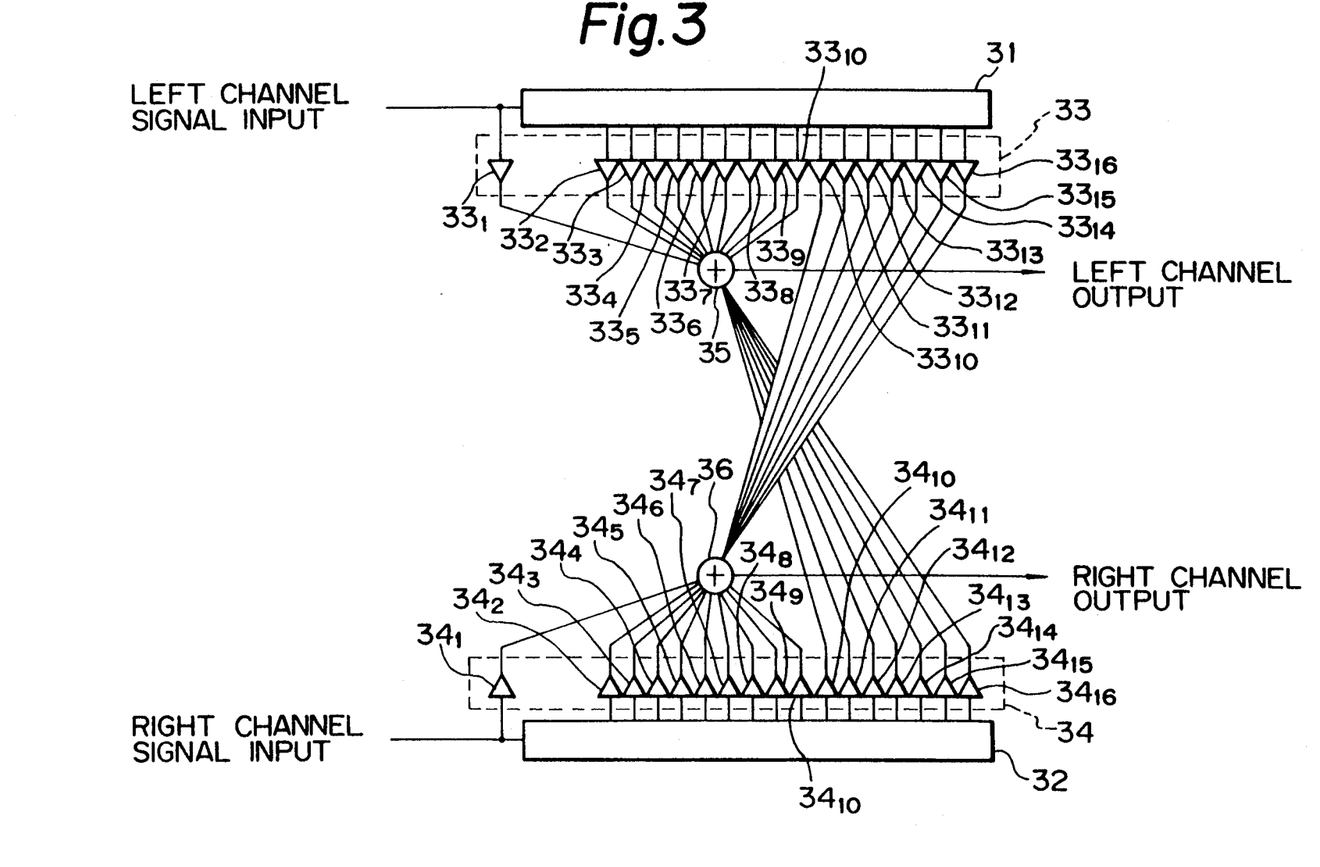
FIG. 3 is a block diagram of an equivalent circuit that provides the same performance as a DSP (digital signal processor)

FIG. 3 shows an equivalent analog circuit that performs the above-described operations. With this circuit, the input audio signals over the right and left channels are supplied to delay elements 31 and 32. In turn, the delay elements 31 and 32 delay the respective input audio signals by a plurality of delay time units for output. These delayed right and left channel audio signals and the input audio signals are supplied to multiplication circuits 33 and 34 to generated a plurality of reflected sound signals. The multiplication circuits 33 and 34 have a plurality of mulitpliers $33_1$ through $33_{16}$ and $34_1$ through $34_{16}$ whereby each of the supplied input audio signals and of the delayed audio signals is multiplied by an appropriate coefficient. The outputs of the multipliers $33_1$ through $33_9$ and those of the multipliers $34_{10}$ through $34_{16}$ are connected to an adder 35. The adder 35 adds to a direct sound signal from the multiplier $33_1$ the reflected sound signals from the multipliers $33_2$ through $33_9$ and $34_{10}$ through $34_{16}$. The result is a left channel output audio signal corrected with the appropriate sound field. The outputs of the multipliers $34_1$ through $34_9$ and those of the multipliers $33_{10}$ through $33_{16}$ are connected to an adder 36. The adder 36 adds to a direct sound signal from the multiplier $34_1$ the reflected sound signals from the multipliers $34_2$ through $34_9$ and $33_{10}$ through $33_{16}$. The result is a right channel output audio signal also corrected with the appropriate sound field. The circuit in FIG. 3 is an equivalent circuit on the front side; the same circuit is also used on the rear side. Alternatively on the rear side, not the reflected sound signals but reverberated sound signals may be generated from the difference in signal level between the right and left channels. These reverberated sound signals on both channels may be individually level-adjusted by multipliers for output.

The microcomputer 11 supplies the sound field control circuit 7 with the data for designating sound field patterns. When a sound field mode is specified from the keyboard, the microcomputer 11 stores in the RAM 28 the sound field data number in conjunction with the disk number (to be entered by disk number key) showing the location of the applicable disk in the magazine 1. Upon playback, the microcomputer 11 reads from the RAM 28 the sound field data number corresponding to the disk to be reproduced on the basis of the disk number. Furthermore, the microcomputer 11 reads from the ROM 29 the sound field data associated with the currently read sound field data number. The microcomputer 11 supplies the sound field control circuit 7 with the sound field data so that the sound field pattern designated by that data is acquired. As designated, the microcomputer 11 provides continuous playback, programmed playback or random playback. At the same time, the motors Ma and Mb are driven under control by the microcomputer 11 via driving circuits 37 and 38.

Figure 4:
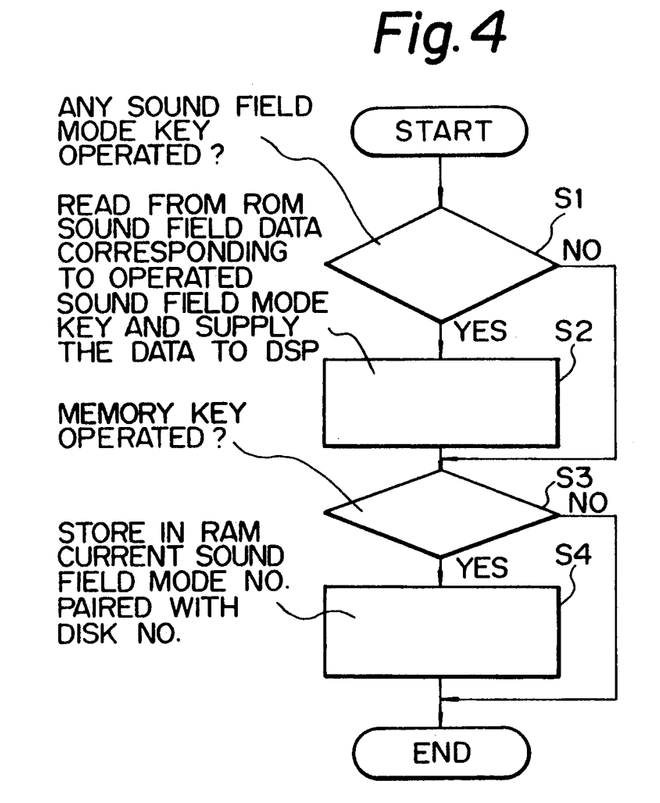
FIGS. 4 and 5 are flowcharts depicting the steps to set a sound field with the multiple disk player of FIG. 1.

There will now be described the steps taken by the processor of the microcomputer 11 to store a sound field with respect to the reproduced sound by reference to the flowchart of FIG. 4.

In step S1, the processor checks to see if any of the sound field mode keys is operated on the keyboard 26. If the key operation is detected, the processor reads from the ROM 29 the sound field data represented by the sound field mode number corresponding to the operated key, and supplies the data to the DSP 12 in step S2. The sound field data to be read comprises items of delay time data and coefficient data. The delay time data items are fed to the delay time RAM 25 to update the contents thereof. The coefficient data items are supplied to the coefficient RAM 17 also to update the contents thereof. These operations change both the signal data delay time and the coefficient by which to multiply the signal data Thus, given the same input signal data, the resulting initial reflected sound data still varies depending on the sound field data, i.e., the delay time data and coefficient data. Where the sound field pattern requires modifying the processing program, the processing program is also read out as sound field data and written to the program memory 30, thus allowing the DSP 12 to operated on a new processing program.

After step 12, the processor checks to see in step S3 if the memory key is pressed on the keyboard 26. If the key is found to be operated, the processor stores into the RAM 28 the current sound field mode number in conjunction with the disk number. Every time a sound field mode key is operated, the corresponding sound field mode number is latched in the microcomputer 11 and remains therein until another sound field mode key is pressed. The disk number, any of 1 through 6, is to be designated before the setting of a sound field by use of the disk number keys 1–6 on the keyboard 26. Unless the memory key is operated, no sound field mode number will be stored in the RAM 28 in connection with any disk number. Alternatively, however, the memory key may be omitted and a sound field mode number may be stored in the RAM 28 in conjunction with the corresponding disk number every time a sound field mode key is operated.

Figure 5:
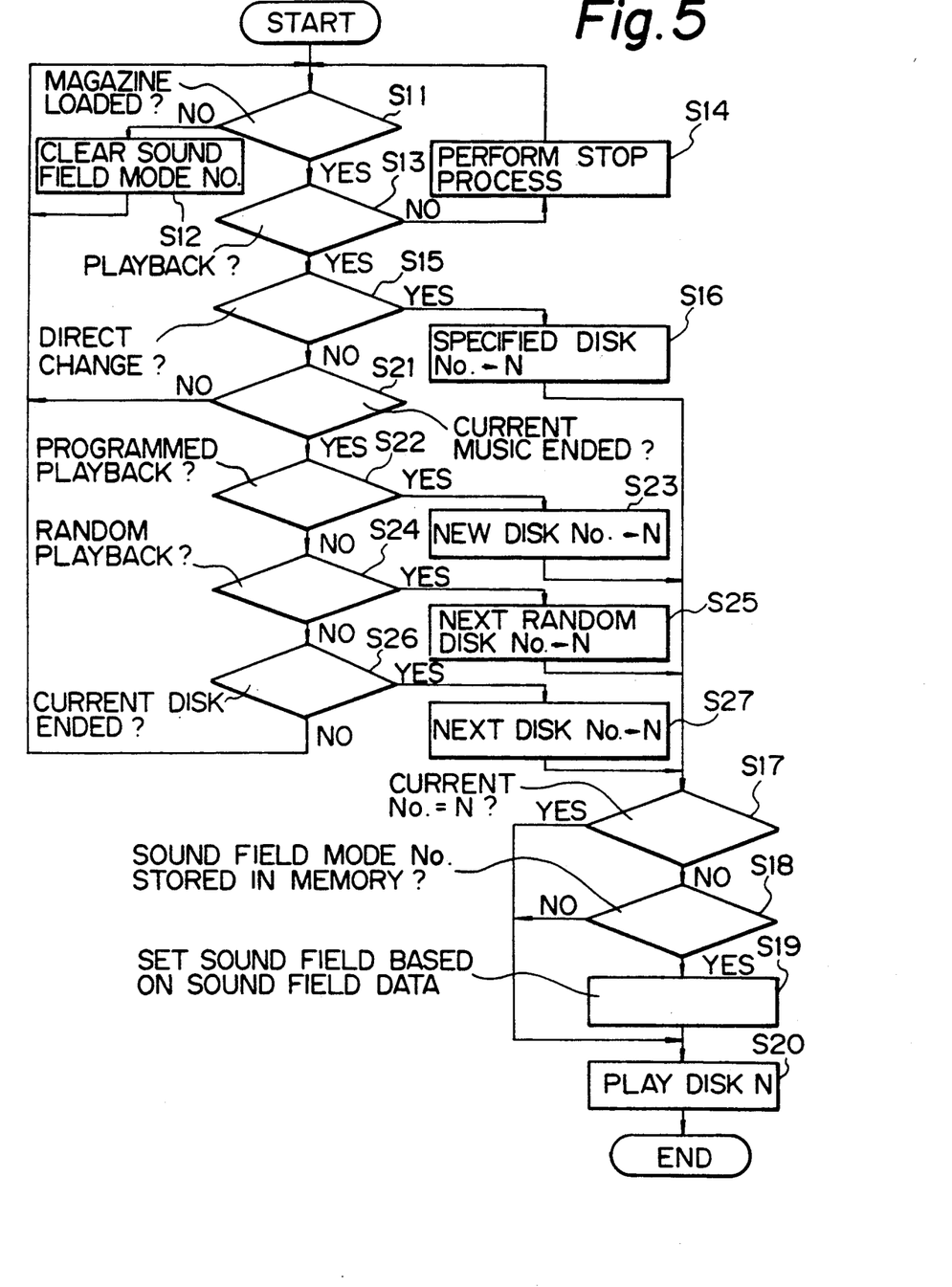

What follows is a desecription, by reference to FIG. 5, of the steps taken by the processor to automatically set a sound field for the reproduced sound based on the sound field data stored on each disk.

In step S11, the processor checks to see if the magazine 1 is loaded. If the magazine 1 is found not loaded, step S12 is reached where the processor clears that area of the RAM 28 in which to store a sound field mode number, and step S11 is reached again. If the magazine 1 is found to be loaded, the processor checks to see in step S13 if a disk is being played back. If no disk is currently played back, the processor stops the playback process in step S14 and returns to step S11. If a disk is being played back, the processor checks to see in step S15 if direct disk change is specified by any of the disk number keys 14 selecting any of disk numbers 1 through 6. In the case of direct change, the specified disk number is acquired in step S16.

The processor then checks to see in step S17 if the specified disk number is the same as the current disk number, i.e., whether or not the specified disk is the currently reproduced disk. If the specified disk is different from the disk currently played back, the processor checks to see in step S18 if the sound field mode number of the specified disk is stored in the RAM 28. If the sound field mode number is found stored in the RAM 28, the processor reads from the ROM 29 the sound field data associated with the stored sound field mode number, and feeds the data to the DSP 12 in step S19. In step S20, the processor directs the player to play back the disk. The feeding of the sound field data to the DSP 12 in step S19 is the same as that in step S2. If the specified disk is found to be the same as the currently played disk in step S17, or if the sound field mode number of the specified disk is found not stored in the RAM 28 in step S18, the processor goes to step S20 and starts the playback process using the current sound field.

If direct change is found not specified in step S15, the processor checks to see in step S21 if the current piece of music has come to an end. If the music is yet to be terminated, the processor returns to step S11. If the music is found stopped in step S21, the processor checks to see in step S22 if programmed playback is in effect. If program playback is in effect, the processor calls the next disk number in step S23. Then the processor goes to step S17 and checks to see if the disk to be played next is the same as the current one. Thereafter, steps S18 through S20 are repeated.

If programmed playback is found not in effect in step S22, the processor checks to see in step S24 if random playback is in effect. If random playback is in effect, the processor calls the next disk number to be specified randomly in step S25. The processor then goes to step S17 and again checks to see if the disk to be played next is the same as the current disk. Thereafter, steps S18 through S20 are repeated.

If random playback is found not in effect in step S24, the processor checks to see in step S26 if the currently played disk has come to an end. If the disk is yet to be terminated in playback, the processor returns to step S11. If the current disk has come to an end of its playback the processor calls the disk number of the next disk to be played in step S27. The processor then goes to S17 and checks to see if the next disk to be played is the same as the current disk. Thereafter, steps S18 through S20 are repeated likewise.

As indicated, the sound field of the reproduced sound is set for each of the disks and stored in conjunction with the corresponding disk number. Upon playback, a stored sound field is seleted based on a given disk number so that the sound field is automatically set for each disk. This eliminates the need for the user to set an appropriate sound field everytime disks are changed. Thus if each of the disks in the magazine 1 contains a different kind of music, the optimum sound quality for each disk may be set and stored before playback. In this manner, reproduced sound of high quality is available without the need to readjust the sound field upon every disk change.

Figure 6:
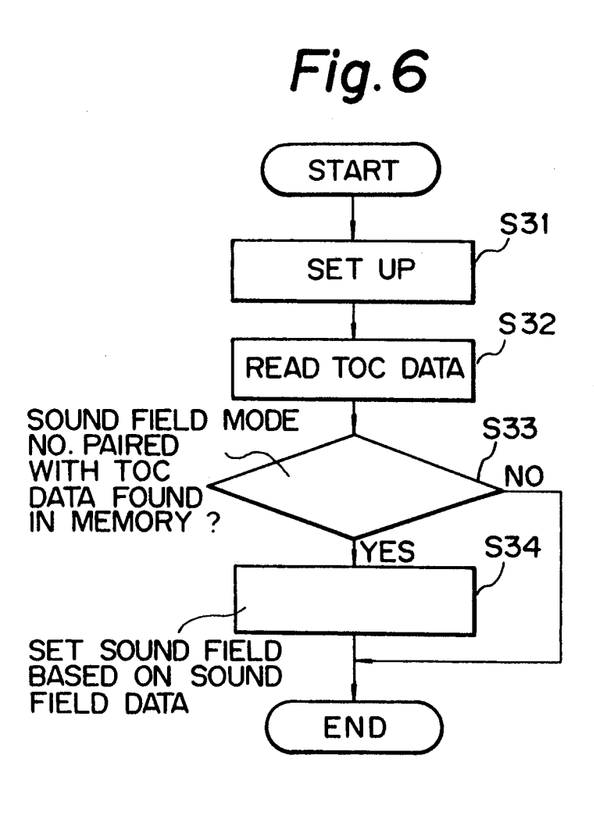
FIG. 6 is a flowchart describing the steps to set a sound field with a single disk player embodying the present invention.

In the embodiment described above, the invention is practiced with the multiple disk player. In an alternative emodiment, the invention may be practiced with a single disk player. In this case, the TOC (table of contents) data read from each disk is used as disk ID data. The RAM 28 stores the TOC data paired with the sound field mode number specified by operation of a sound field mode key for each disk. Upon playback, as shown in the flowchart of FIG. 6, the processor sets up the currently loaded disk in step S31. In step S32, the processor reads the TOC data from the disk. In step S33, the processor checks to see if the sound field mode identified by the TOC data for the disk is stored in the RAM 28. If the sound field mode is found stored in the RAM 28, the processor goes to step S34 where the sound field data corresponding to the sound field mode number is read from the ROM 29 and supplied to the DSP 12. The processor then proceeds to perform search and play operations on the disk. If the sound field data for the disk to be played is found not stored in the RAM 28, the processor proceeds to search and play using the sound field based on the currently established sound field data. It will be obvious that the TOC is also used as disk ID data with the multiple disk player.

The recording medium playing apparatus may be not only a disk player but also a tape deck. With the tape deck, a bar code may be illustratively attached to the cassette half for use as ID data of the cassette tape.

In above embodiments, sound field mode numbers are stored in conjunction with ID data for each recording medium. Alternatively, sound field data may be stored along with each playback program.

In the above embodiments, only the sound field is controlled. Alternatively, both sound volume and sound quality may be controlled by the DSP in connection with control of the sound field thereby. This scheme further widens the range of freedom in which users can create the acoustic ambience to their linking.

Another variation of the invention is to have a display device display the sound field mode in effect while the disk is being played and/or the sound field mode specified by a sound field mode key.

As described, the recording medium playing apparatus according to the present invention involved first getting a memory means to store, in connection with the ID data of each recording medium, the sound field data representing the sound field pattern specified by a key operation. Upon playback, the sound field data corresponding to the recording medium to be played is retrieved from the memory means according to the ID data. Audio signals are then corrected using the appropriate sound field in accordance with the sound field data. Thus an appropriate sound field is set automatically for each recording medium. This eliminates the need for the user to readjust the sound field everytime a new recording medium is set.

In particular, on a recording medium playing apparatus that automatically changes recording media loaded therein, the kinds of music recorded on the media may be different from one another. In such a case, an appropriate sound field may be set beforehand for each recording medium. This eliminates the distracting and uncomfortable experience that listeners would otherwise have when a given recording medium is played with an incompatible sound field.

It is to be understood that while the invention has been described in conjunction with specific embodiments, it is evident that many alternatives, modifications and variations will become apparent to those skilled in the art in light of the foregoing description. Accordingly, it is intended that the present invention embarace all such alternatives, modifications and variations as fall within the spirit and scope of the appended claims.

What is claimed is:

1. A recording medium playing apparatus for correcting audio signals using an appropriate sound field to simulate sound effects corresponding to a particular recording medium, said audio signals being selected from among signals retrieved from the particular recording medium upon playback, said apparatus comprising:

operating means for specifying a sound field to be reproduced;

memory means for storing sound field data paired with corresponding recording medium ID data, said sound field data representing a pattern of the sound field specified by said operating means; and sound field control means operatively coupled to said operating means and said memory means for controlling reproduction of said sound field, whereby the sound field data corresponding to the particular recording medium to be played is read upon playback from said memory means in accordance with said recording medium ID data, said audio signals being corrected with the corresponding sound field according to the sound field data that has been retrieved.

2. A recording medium playing apparatus according to claim 1, wherein said memory means stores TOC (table of contents) data extracted from said signals retrieved from said recording medium as said ID data.

3. A recording medium playing apparatus according to claim 1, wherein said sound field control means comprises a microcomputer and a sound field control circuit, said microcomputer being connected with said operating means and said memory means, said sound field control circuit being controlled by said microcomputer.

* * * * *